(No Model.) 2 Sheets—Sheet 1.

W. M. McKENZIE.
FISH TRAP.

No. 530,444. Patented Dec. 4, 1894.

WITNESSES:
John A. Rennie

INVENTOR
W. M. McKenzie
BY
Munn & Co.
ATTORNEYS.

(No Model.) 2 Sheets—Sheet 2.
W. M. McKENZIE.
FISH TRAP.
No. 530,444. Patented Dec. 4, 1894.
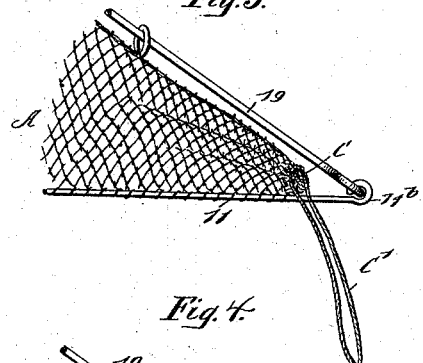
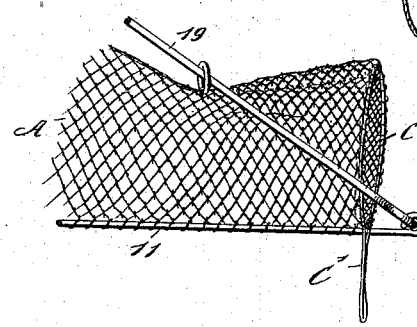
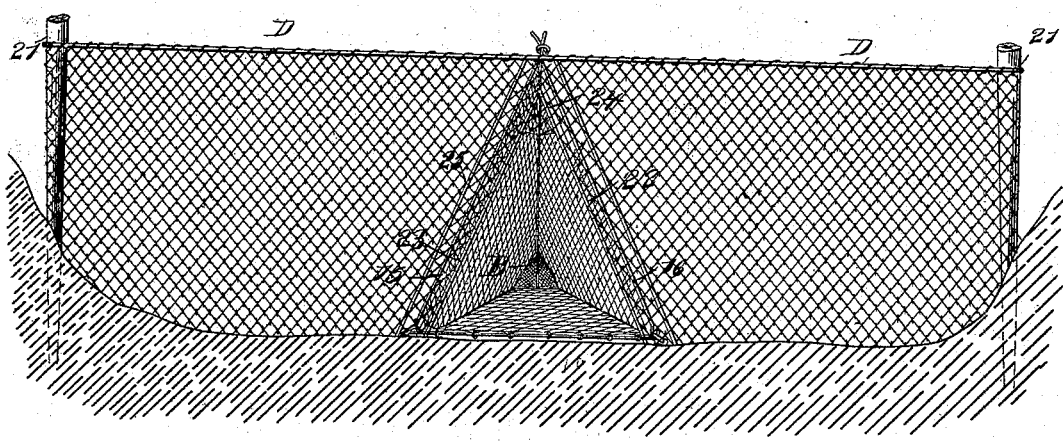
WITNESSES:
INVENTOR
W. M. McKenzie
BY Munn & Co
ATTORNEYS.

UNITED STATES PATENT OFFICE.

WILLIAM M. McKENZIE, OF NEW YORK, N. Y.

FISH-TRAP.

SPECIFICATION forming part of Letters Patent No. 530,444, dated December 4, 1894.

Application filed August 30, 1894. Serial No. 521,666. (No model.)

*To all whom it may concern:*

Be it known that I, WILLIAM M. MCKENZIE, of New York city, in the county and State of New York, have invented a new and Improved Fish-Trap, of which the following is a full, clear, and exact description.

My invention relates to an improvement in fish traps or nets, and the object of the invention is to provide a trap especially adapted for the capture of minnows, eels and other fish by impounding or entrapping them.

A further object of the invention is to provide a trap which will consist essentially of netting constructed in the form of a bag in the mouth of which, or at any desired point therein, a funnel is set extending within the body of the trap, likewise preferably constructed of netting, and through which the fish pass into the trap, the netting being distended by means of rods or equivalent supports, straight or bent, so placed as to firmly hold the bag and funnel in a distended position, the supports being so connected that they may be readily disconnected or folded one upon the other, enabling the trap to be placed in a casing such as it is customary to use in carrying fishing rods, or packed in an exceedingly small compass.

Another object of the invention is to provide a means whereby netting wings or fencings may be used in connection with the trap proper to form a barrier to the fish on either side of the trap, likewise serving to guide them into the trap, the wings or fencings being readily detached from the body of the trap when desired, and whereby further the trap may be placed in a running stream, in which event it is employed preferably in connection with the wings or fencing, or whereby the trap may be used exclusive of the latter, or even in connection therewith, and sunk into a quiet stream, in which event a suitable bait is placed within the trap.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
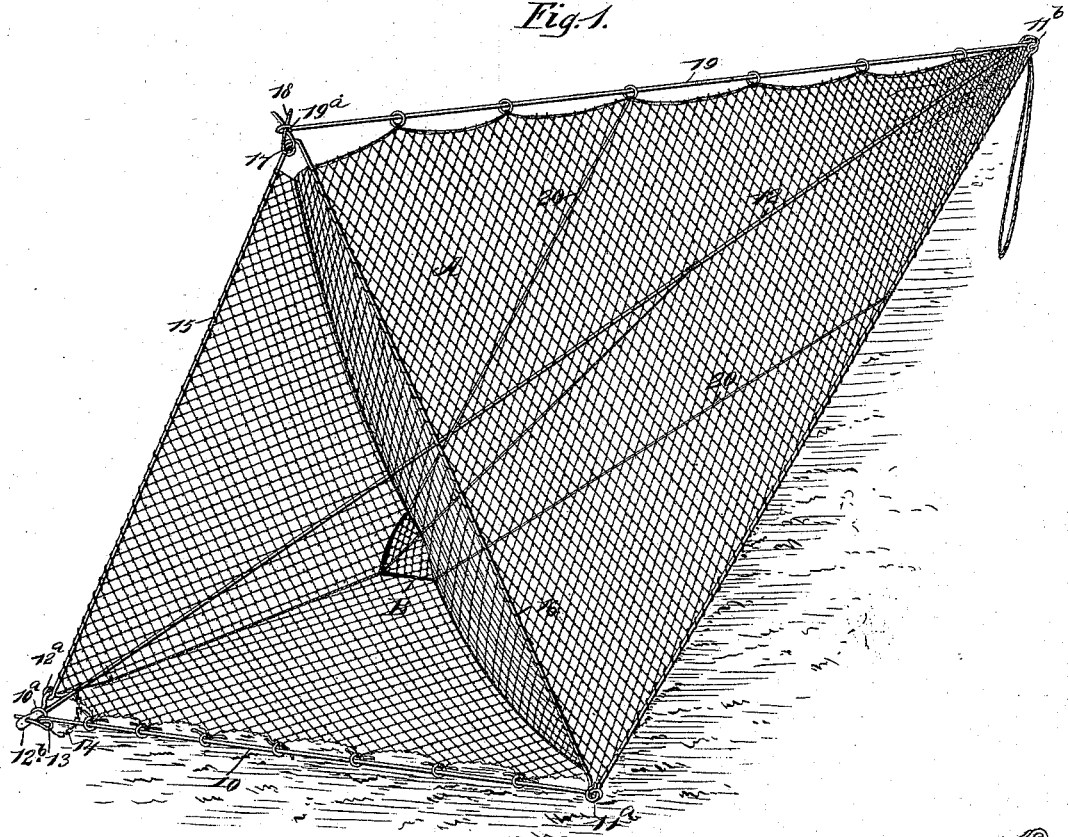
Figure 2:
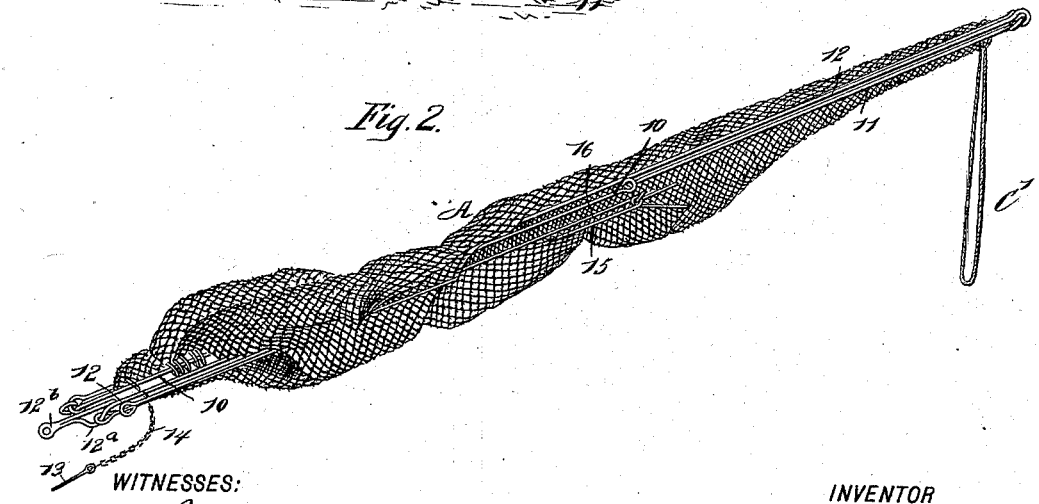

Figure 1 is a perspective view of the improved trap in the position for use, the wings or fencing being omitted. Fig. 2 is a perspective view of the trap folded. Fig. 3 is a detail view of the rear end of the trap, illustrating said end as closed. Fig. 4 is a view similar to Fig. 3, illustrating the rear end of the trap as open, the opening being for the exit of the fish after they have been entrapped; and Fig. 5 is a front elevation of the trap with the wings or fencing applied thereto.

In carrying out the invention the form of trap shown is somewhat triangular, and comprises a front bottom rod 10, and two side rods 11 and 12, one of the side rods 11 having a pivotal or hinged connection $11^a$ with the front rod 10, while the opposite side rod 12 is provided with an eye $12^a$ back of its forward end, and the forward end $12^b$ of the rod is provided with an aperture through which a pin 13 may be passed, usually attached to the frame of the trap by a chain or cable 14. The forward end $12^b$ of the side rod 12 is adapted to be passed through an eye $10^a$ in one extremity of the front lower rod 10 of the frame, as shown in Fig. 1, and after being passed through the side rod the pin 13 is placed in position. The rear ends of the two side rods 11 and 12 meet and are pivotally connected, or have a suitably hinged connection.

In the further construction of the frame two upright rods 15 and 16 are employed, and these rods are pivotally connected, the rod 15 with the eye $12^a$ of the side rod 12, and the rod 16 at the junction $11^a$ of the lower front rod and side rod 11. Ordinarily the two upright front rods 15 and 16 are connected at the top through the medium of interlocking eyes 17, or their equivalents, and each rod is provided with an extension 18, as shown in Fig. 1. Thus the front of the frame of the trap is somewhat of the shape of the letter A, or an equilateral triangle.

The top or ridge rod 19, has an eye $19^a$ at one of its ends, receiving the extensions 18 from the front upright rods 15 and 16; and the said ridge or top rod 19 is carried rearward and is pivotally connected with the side rods 11 and 12 where these rods are connected.

A netting A, in the form of a bag and of substantially the shape of the frame, is secured to all of the rods with the exception of the front lower rod 10 and the upper or ridge rod 19, and upon these rods the netting has sliding movement, the rods having been passed through rings attached to the netting. Usually in the front of the netting an inwardly-extending funnel B is formed, being held in its inner position by cables 20 attached to the opening in the funnel and usually to the side rods 11 and 12 and to the ridge rod 19. In the back of the netting an opening C is produced capable of being closed by a drawstring C', as illustrated in Figs. 2 and 3, and through the opening thus made the fish find their exit from the trap after having been caught.

A wing or fencing D may be employed in connection with the trap, as shown in Fig. 5, in which event the said wing or fencing is likewise made of netting, and its ends are secured to posts 21 adapted to be driven in the bed of a stream, or in the bank at each side thereof. The fencing or wings are spoken of in the plural since they are formed one at each side of the trap, and preferably the two fences or wings are integral, and are provided with a central opening 22, of a shape corresponding to that of the mouth of the trap, or the entrance to the funnel; but the opening 22 is smaller than the entrance to said funnel, and the inner edge is protected by rods 23, cables or like devices, a curtain 24, of netting, being located at the top of said opening, while the fencing or wing at each side of the trap is braced or strengthened by cables 25, extending from the bottom to the top and having an inclination corresponding to the inclination of the sides of the trap proper.

In operation, if the trap is set in a still stream it is sunk to the bottom and preferably weighted; and if the fish are to be impounded therein, the barrier D is placed across the stream, and the open part at the inner portion of the barrier is made to extend over the opening of the funnel B and to extend a slight distance in direction of the rear of the latter, as is illustrated in the said Fig. 5. Under this construction, it will be observed, that all of the fish swimming down stream, or in the direction in which the water flows, will be directed into the trap. When a sufficient quantity of fish has been caught in the trap, they are spilled out therefrom through the rear opening C.

When the trap is no longer required it may be collapsed and packed in an exceedingly small compass, as for example in a bag or casing such as is commonly employed to carry a fishing rod. This collapsing is accomplished by removing the side rod 12 from connection with the front of the frame, and disconnecting the uprights 15 and 16 from the eye or other fastening device employed at the forward end of the top or ridge rod 19, whereupon the rods and the netting may be compactly folded, as shown in Fig. 2, and may be readily stored, or conveniently carried from place to place.

I desire it to be understood that as heretofore stated, more than one funnel may be employed, and that the form of the frame may be varied as may likewise the form of the rods or members of the frame.

Having thus described my invention, I claim as new and desire to secure by Letters Patent—

1. In a fish trap or the like, the combination of three rods pivotally connected to each other at one end and adapted to be folded together parallel to each other, means for holding the opposite ends of said rods away from one another, whereby a collapsible frame is formed, of a netting secured to said frame and adapted to be held in place thereby and a funnel secured at the mouth of the netting, substantially as set forth.

2. In a fish trap or the like, the combination of the ridge rod, and side rods pivotally connected to each other at one end, a front rod connected at its opposite ends to the respective side rods, upright rods each connected at one end to one of the side rods and at its other end to the ridge rod, whereby said ridge rod and side rods are held away from one another at one end to form a frame, a netting secured to the frame and adapted to be held in place thereby, and a funnel secured at the mouth of said netting, substantially as set forth.

3. In a fish trap or the like, the combination of a ridge rod and two side rods pivotally connected to each other at one end, a front rod having one end connected to one side rod and having at its other end an eye to receive the end of the other side rod, whereby said side rods are held spaced apart at their front ends, upright rods each loosely connected at one end to one of the side rods adjacent to the said front rod, the opposite ends of said upright rods being connected to the front end of the ridge rod, whereby a frame is formed, a netting secured to the frame and adapted to be held in place thereby, and a funnel secured at the mouth of the netting, substantially as set forth.

4. The combination of a ridge rod and two side rods pivotally connected together at one end, the ridge rod and one side rod each having at the opposite end an eye, and the other side rod having at its opposite end two eyes, two upright rods each having at one end an eye connected to the eye in one of the side rods, the upper ends of said upright rods being adapted to interlock and having extremities which extend through the eye in the ridge rod, a front rod having an eye in one end to receive the end of that side rod which is provided with two eyes, a pin inserted through the other eye of the said side rod, the other end of the front rod being connected to the eye in the other side rod, whereby a collapsible frame is formed, a netting secured to said frame and adapted to be held in place thereby, and a funnel secured within the mouth of the said frame, substantially as set forth.

WILLIAM M. McKENZIE.

Witnesses:
JNO. M. RITTER,
F. C. BEACH.